(12) United States Patent
Doany et al.

(10) Patent No.: US 6,597,410 B1
(45) Date of Patent: Jul. 22, 2003

(54) SYSTEM FOR THE AUTOMATIC ADAPTATION OF PROJECTOR IMAGES AND A METHOD FOR THE IMPLEMENTATION THEREOF

(75) Inventors: Fuad Elias Doany, Katonah, NY (US); Dimitri Kanevsky, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,621

(22) Filed: Nov. 10, 1999

(51) Int. Cl.[7] .......................... H04N 9/31; H04N 3/22; H04N 3/26; H04N 3/223; G03B 21/26; G03B 21/14; G03B 21/56; G09G 5/08

(52) U.S. Cl. ...................... 348/744; 348/745; 348/746; 348/747; 348/755; 348/383; 353/29; 353/30; 353/34; 353/48; 345/157; 345/158; 359/443; 359/448

(58) Field of Search ................................ 348/744, 747, 348/745, 746, 751, 755, 189, 190, 191, 657, 658, 383; 353/30, 29, 34, 48, 42; 345/157, 158; 359/443, 448, 456, 460

(56) References Cited

U.S. PATENT DOCUMENTS

| | | | | |
|---|---|---|---|---|
| 4,999,703 A | * | 3/1991 | Henderson | 358/64 |
| 5,231,481 A | * | 7/1993 | Eouzan et al. | 358/60 |
| 5,621,486 A | | 4/1997 | Doany et al. | |
| 5,742,698 A | * | 4/1998 | Minami et al. | 382/100 |
| 5,777,789 A | * | 7/1998 | Chiu et al. | 359/494 |
| 5,786,873 A | | 7/1998 | Chiu et al. | |
| 5,786,934 A | | 7/1998 | Chiu et al. | |
| 5,793,441 A | * | 8/1998 | Hagerman | 348/658 |
| 6,061,102 A | * | 5/2000 | Sheppard et al. | 348/745 |
| 6,067,112 A | * | 5/2000 | Wellner et al. | 348/211 |
| 6,222,593 B1 | * | 4/2001 | Higurashi et al. | 348/745 |
| 6,310,650 B1 | * | 10/2001 | Johnson et al. | 348/383 |
| 6,310,662 B1 | * | 10/2001 | Sunakawa et al. | 348/747 |
| 6,346,933 B1 | * | 2/2002 | Lin | 345/157 |

* cited by examiner

*Primary Examiner*—John Miller
*Assistant Examiner*—Paulos Natnael
(74) *Attorney, Agent, or Firm*—Scully, Scott, Murphy & Presser; Daniel P. Morris, Esq.

(57) ABSTRACT

A computerized projector system which automatically adapts projected images emanating from projectors to fit the size and conditions of screens on which the images are displayed. Moreover, disclosed is a novel method of utilizing a computerized projector system which automatically adapts projected images to a shape and condition in correlation with the size and configuration of the screens onto which the images are projected.

30 Claims, 7 Drawing Sheets

SUN LIGHT

ORIENTATION CHANGED

CONTRAST IS CHANGED

us 6,597,410 B1

SYSTEM FOR THE AUTOMATIC ADAPTATION OF PROJECTOR IMAGES AND A METHOD FOR THE IMPLEMENTATION THEREOF

BACKGROUND OF THE INVENTION

1. Field of the Invention

The present invention relates to a computerized projector system which automatically adapts projected images emanating from projectors to fit the size and conditions of screens on which the images are displayed. Moreover, the invention is directed to a novel method of utilizing a computerized projector system which automatically adapts projected images to a shape and condition in correlation with the size and configuration of the screens onto which the images are projected.

In projecting images onto a screen, the latter of which may be a standard projector screen, a wall surface, a paper listing, a ceiling, a floor or any covering surface adapted to have images projected thereon and displayed, upon occasion the projector may be viewing or directing images towards the screen from an angle such that an upper part of the image may be wider than the lower part of the image, thereby providing a distorted image. This is frequently an occurrence when the screen or display surface is curved or of an irregular surface configuration at various locations. Furthermore, distortions in the image or discontinuities in the projected image on the screen may be encountered when beams of light impinge against the display surface; for instance, such as sunlight entering through windows or the like, which can adversely affect the quality of the projected image.

Although measures have been taken to implement corrective actions in an attempt to improve upon the quality of projected images, these are relatively complex and do not always successfully lead to the desired results.

2. Discussion of the Prior Art

Thus, for instance, a current method of correcting or controlling projected images on a display surface may be through the intermediary of transmission light valve projectors utilizing, for instance, three light valves. Other methods and systems incorporating reflective light valve projectors utilize three light valves in which a considerable number of components consisting of an illumination module with various mirrors operate in conjunction with optics in a light engine possessing a complicated and difficult to control projection system for regulating images which are to be transmitted onto a screen or other suitable display surfaces.

Systems of this type are disclosed in Chiu et al. U.S. Pat. Nos. 5,786,934 and 5,786,934; and Doany et al. U.S. Pat. No. 5,621,486; all of which are entitled "Efficient Optical System for a High Resolution Projection Display Employing Reflection Light Valves"; and which are commonly assigned to the present assignee.

SUMMARY OF THE INVENTION

Accordingly, in order to clearly and unambiguously provide a computerized projector system which will automatically adapt projected images to the shape, condition and position of a display screen, pursuant to the invention there is provided a system which essentially comprises a video camera which is connected to a projector and which obtains images from a screen on which there are displayed images projected from the projector; an image processing module which obtain images from some external source and stores these images in a RAM (random access memory); an adapter module which compares the screen format with images stored in the RAM and transforms these images so as to fit the screen display; and wherein a projector displaying module has the projector projecting the transformed images onto a screen.

In effect, the screen, which is adapted to display the corrected and appropriately sized and configured images may be a standard projection screen, a wall, a paper list, a ceiling, a floor, or any suitable covering surface, which may be planar or curred in nature.

Accordingly, it is an object of the present invention to provide a system for controlling the size and quality of images which are transmitted by projectors so as to be able to fit diverse types of screens onto which the images are projected.

A more specific object of the present invention resides in the provision of a computerized projector system which automatically adapts projected images to the shape and position of a remotely located display screen.

A further object of the present invention resides in the provision of a method of projecting images onto a screen and automatically correlating the images so as to fit the screen irrespective as to the angular position of the screen or configuration thereof relative to an image-transmitting projector viewing the screen so as to provide images which are correct in their configuration and are fitted relative to the screen.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF A PREFERRED EMBODIMENT

Figure 1:
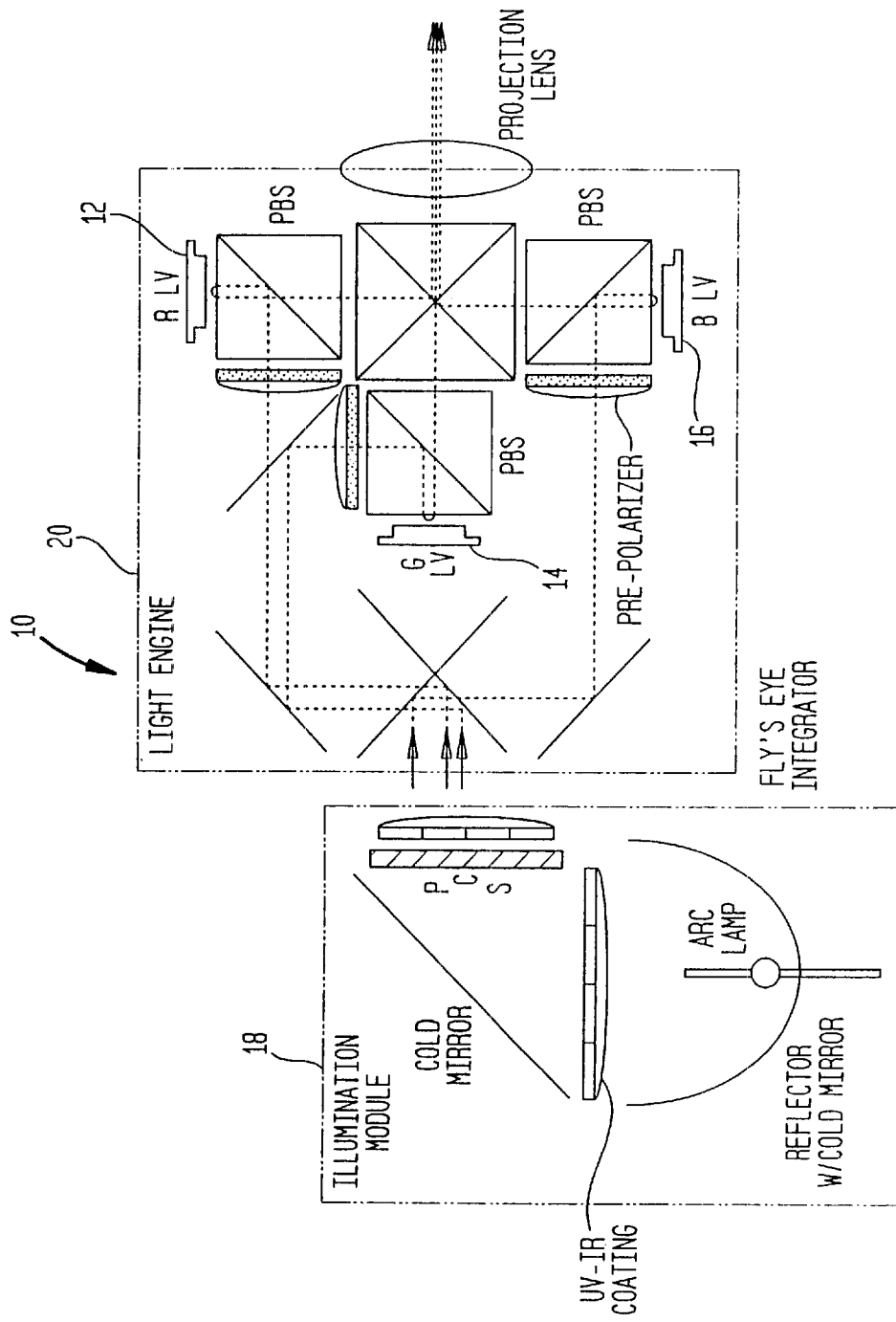
FIG. 1 illustrates a prior art reflective light valve projector for projecting images onto a screen.

Referring now in detail to the drawings, and particularly the prior art system for projecting images onto a screen as shown in FIG. 1, of the type set forth in the above-mentioned U.S. patents, there is shown a reflective light valve projector 10, such as a digital projector, utilizing three light valves 12, 14, 16, wherein an illumination module 18 containing various optical components operates in conjunction with a light engine 20 containing the light valves, utilizing a complex system of lenses and projection optics in order to provide images onto a screen. This is a relatively complex system requiring a considerable amount of components and does not always provide for the appropriate automatic corrective images, particularly when the screen is irregular in its configuration and curvature, is angularly oriented relative to the projector 10, or is subjected to sunlight or various light spots.

Figure 2:
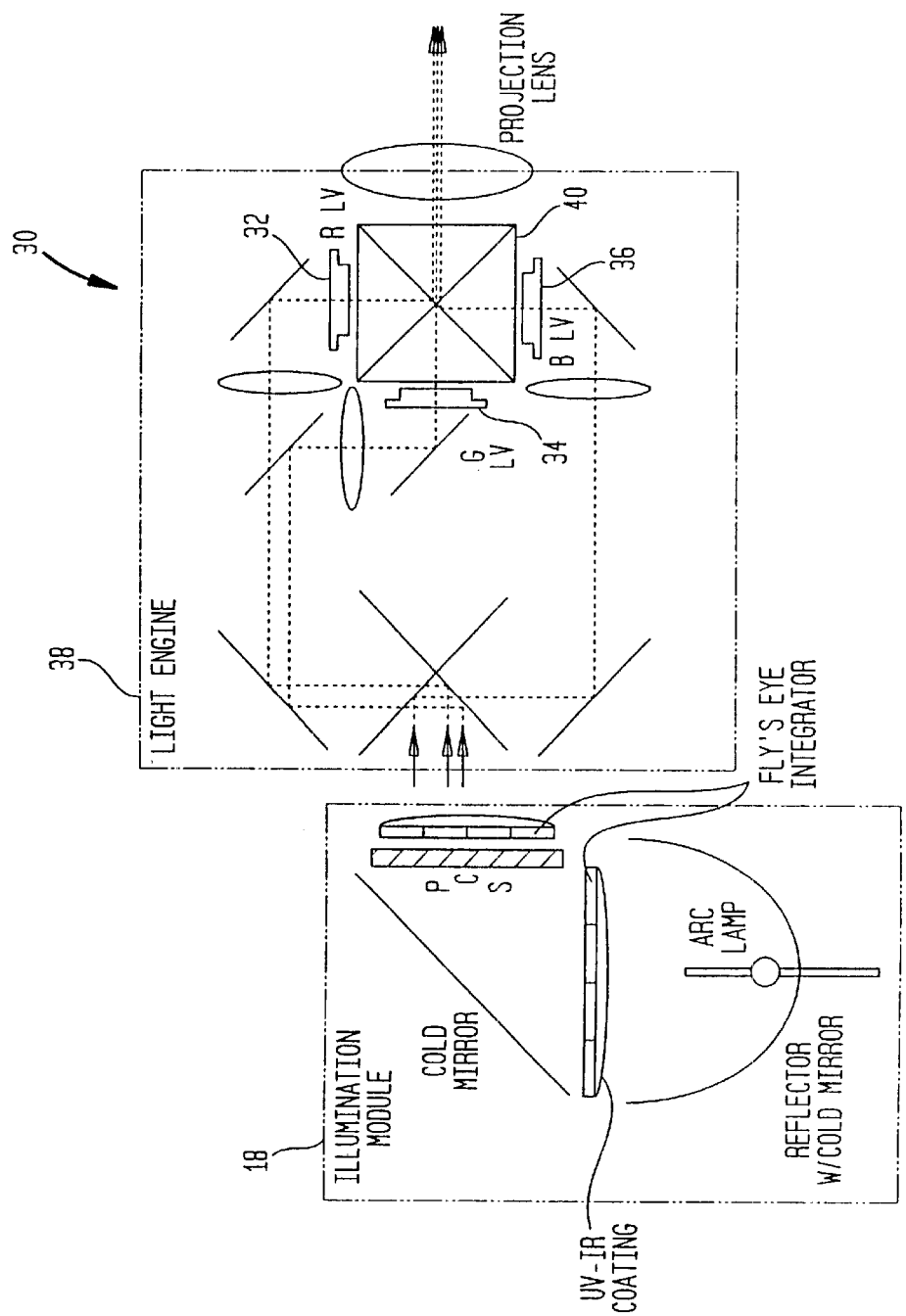
FIG. 2 illustrates a transmission light valve projector for projecting images onto a screen.

Similarly, as illustrated in FIG. 2 of the drawings, there is shown a further prior art transmission light valve projector 30 utilizing three light valves 32, 34, 36 of a light engine 38, which operates in a somewhat similar manner as the reflective light valve projector 10 of FIG. 1, but which provides for somewhat simplified system in utilizing a light engine 38 with a dichroic X-cube beam combiner 40 in contrast with the various optical devices illustrated in FIG. 1. Again, this does not provide for the automatic computerized corrected images being displayed on an irregularly shaped or oriented screen, and, moreover is also of a generally complex and expensive construction.

Moreover, geometric manipulation of pixels in an image is well known to those skilled in the art. For example, in "Fundamentals of Interactive Computer Graphics", J. Foley and A. van Dam discuss mathematical and computer techniques for transformations such as rotation, scaling, and translation, and how these transformations can be combined together in convenient ways. This article also discusses viewing in three dimensions that involve projections of 3-D objects onto 2-D displays.

Additionally, F. Hill's "Computer Graphics" discusses transformations of pictures, including methods for transforming one picture into another and various nonlinear transformations that are useful in raster graphics applications. Other transformations discussed include shearing, affine transformations, and additional complex warpings of figures.

In contrast with the foregoing prior art projection systems, and state-of-the art the present invention, as illustrated in FIGS. 3 through 8 of the drawings, is directed to an extremely simple and highly efficient automatic computerized system for providing corrected high-quality projected images which are controlled so as to be in correlation and fit with the shape and position of a display screen.

Figure 3:
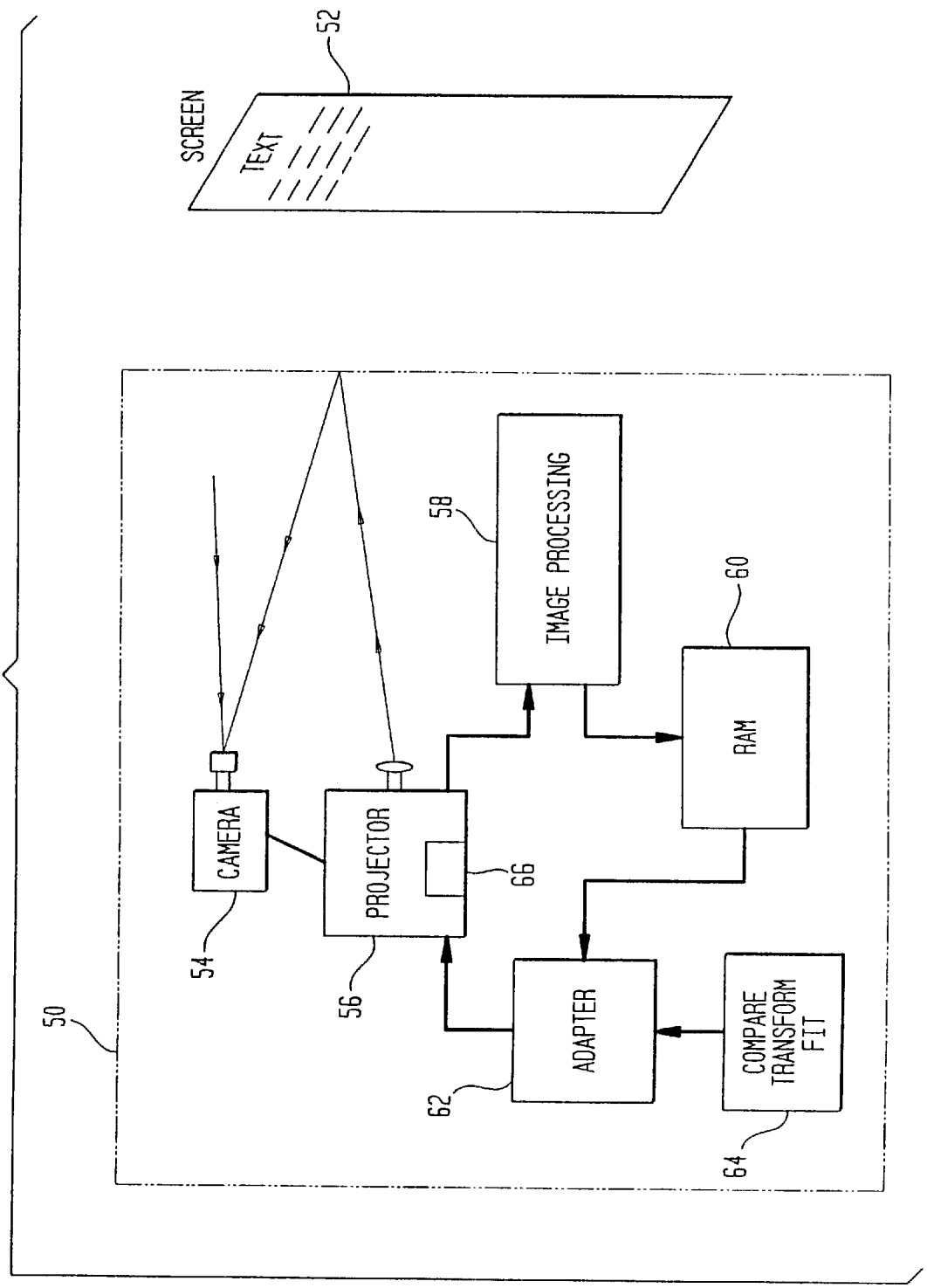
FIG. 3 illustrates a block circuit diagram of a projection system which facilitates automatic corrective adaption of images to a screen.

As illustrated in FIG. 3 of the drawings, the overall computerized projector system 50 which automatically adapts projected images to the shape and position of a display screen 52 consists of an operatively interconnected system of modules.

A video camera 54 is connected to a projector 56 and is adapted receive pictures from a screen which there are displayed images from the projector. A further image processing module 58 connected to the projector 56 obtains images from some external source, as described in further detail hereinbelow, and stores these images in a therewith connected random access memory (RAM) 60.

An adapter module 62 is operatively connected to the RAM 60 and to the projector 56 and includes a comparator module 64 in order to compare the screen format, or provide object recognition as a reference to spectrum screen boundary, with images which are stored in the RAM 60 and to transform these images so as to fit the screen display.

Finally, there is provided a projector displaying module 66 of the projector 56 which projects correctively transformed images onto the screen 52.

Basically, the display screen 52 may be a standard projection screen, any wall, a list of paper, a ceiling, a floor or any suitable covering surfaces onto which images may be projected. The screen format may include one or more aspects of a particular screen contour, screen size, an angular view of the screen from a projector, a screen location, covering surface phenomena and varying brightness at different locations on the screen surface, all affecting the quality of displayed images.

In addition, the projection system may be applicable but not limited to planetariums, IMAX theaters, amusement parks, billboards, sporting event and concert screen displays, financial data displays.

Possibly, the system may also be employed in connection with the transformation of projected moving images onto a screen or display surface. Also contemplated is the possibility of image manipulation in the context of art graphics, both in three-dimensional and two-dimensional aspects. The source from which images are obtained by the image processing module 58 may be either a film with captured images, a memory with stored digital images, or some process which captures images from some discrete locations or places.

In order to be able to obtain the fitness of the transformed images with regard to the screen, this signifies that at least one or more of the following criteria should be satisfied:

(a) each line of an image is accommodated locally with a line on the screen where it is displayed;

(b) the orientation of each unit in an image, as explained further on hereinbelow, is oriented locally in accordance with the orientation of a part of the screen where this image unit is displayed;

(c) the brightness of each unit in an image is correlated locally with the brightness and reflective properties of a corresponding portion of the screen where this image unit is displayed;

(d) the content of each image unit is adapted locally to a geometric form of a local area where this image unit is displayed;

(e) the content of each image unit is adapted to one or several points of view from which the screen is viewed by the projector.

In essence, an image unit is defined by either a part of a text, a letter, a segment of a picture, or a squared small area of a picture.

Basically, the system is adapted to recognize a screen or display surface as an object using object recognition (i.e. a reference), obtaining images which are to be projected on screen from computer memory (in case the images are presented as digital data.

The accommodation of each line of an image on the screen is indicated in that (a) the images are displayed on the screen in a manner as they would be viewed on the screen as if they were printed thereon; or (b) if a line of the screen is curved because a screen contour is transformed, then an image line on the screen is transformed proportionally to the transformation of the screen line.

The local orientation of an image unit on the screen indicates that (a) image units are oriented on the screen in a manner as they would be oriented on the screen as if they were printed thereon; or (b) if the local area of the screen is curved because the screen cover is transformed, then an image unit orientation of the screen is transformed proportionally to the transformation of the screen area.

Hereby, a program in image transformation relates every point of an image to a projected ray, and the camera relates every ray and to an original point. Comparing distances between end image points with original ideal points allows for computing distortion. Thus, for instance, if several points in ideal image leave the same distance and, at the end, different ideal image point distances, these are moved in such a way as to make distances to ideal proportional for projection and should resultingly fit the screen.

In order to accommodate or correlate for image brightness, (a) the image contour is either sharpened or, respectively, softened, if the lighting from the environment reduces, or respectively, increases the perceptual clarity of the displayed images on the screen 52 at local areas; and (b) the brightness of the image colors is varied if there are different sources of lights; for example, such as light obtained from the sun, produce local lighting intensities to reduce variability effects.

The adapter module 62 is basically designed to perform operations to obtain (a) a mathematical representation of an image from a source; (b) a mathematical representation of a screen image obtained from the camera 54; (c) transformation of the mathematical representation to a new representation adapted to fit the mathematical representation of the screen 52 to thereby satisfy viewing conditions; and (d) the representation of the mathematical form of an image as a physical quantity which can be transmitted to the screen 52 by the projector displaying module 66. Thus, a physical quantity which corresponds to the mathematical form of the image is a set of light races which produce the image on the screen 52. The mathematical form of the image is represented by an area in the computer memory; whereas the mathematical form of the image represents image colors, spatial properties and contours. The mathematical transformation which is implemented in the adapter module 62 may employ one or more of the following operations, such as rotation, scaling, changing color intensity, changing figure proportions, changing the orientation of parts of the figure, transforming contours, and utilizing mathematical variables which represent image parameters, such as colors, intensity and brightness.

The mathematical representation of the image screen indicates that there is a representation of the screen 52 as a real geometric figure which would correspond to a screen as viewed from the point of location of the projector 56. The mathematical transformation for satisfying viewing conditions is essentially performed in that (a) a representation of the screen is obtained as an ideal geometric figure which the screen would possess if placed under ideal conditions; (b) a representation of the screen as a real geometric figure; (c) finding mathematical transformations which map an ideal geometric representation of the screen into the real geometric representation; (d) finding a mathematical representation of the image from the source; and (e) applying mathematical transformations from the map which maps ideal geometrical representation of the screen to the real geometric representation, to the mathematical representation of the image obtained from the source.

Consequently, the representation of the screen as an ideal geometric figure indicates a representation of the screen in the most corresponding geometric form; such as square, polygon, circle, oval and the like; and the representation of lighting condition in the most corresponding homogenous form.

Figure 4A:
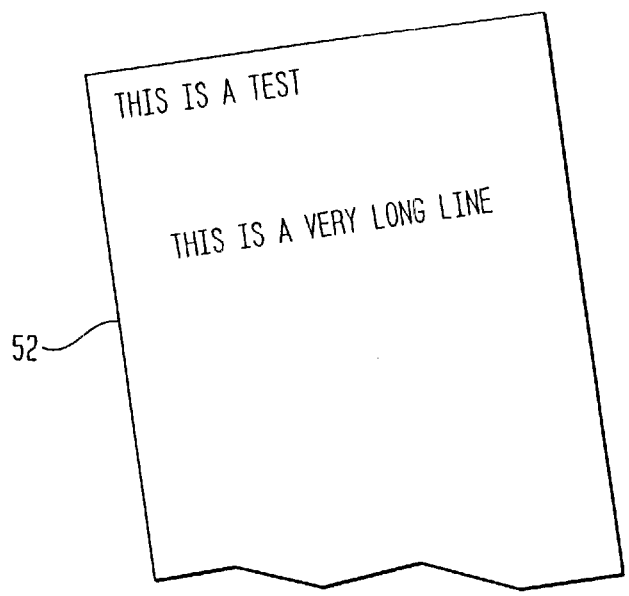
FIGS. 4a to 4c illustrate a schematic representation of the manner in which a display text which does not fit a curved screen and is subjected to sunlight spots is deformed and corrected so as to be accommodated in order fit a screen and improve image contrast.
Figure 4B:
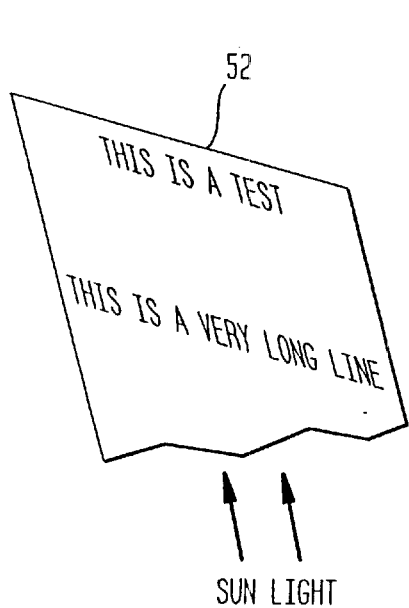
Figure 4C:
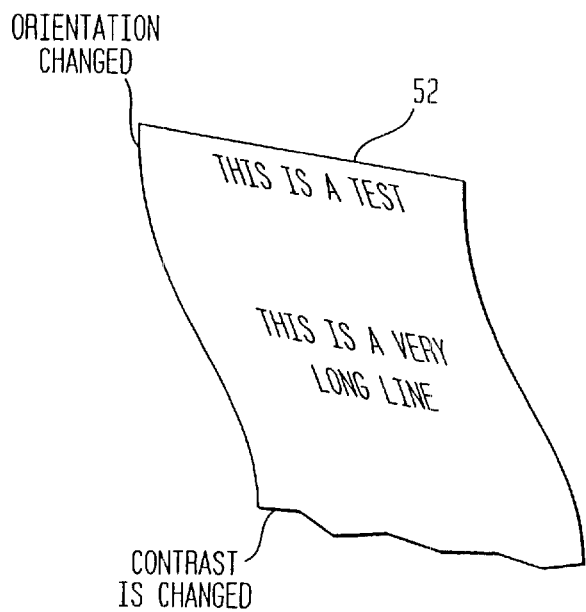

As indicated in FIGS. 4a through 4c of the drawings, the projector 56 indicates the fitness through line accommodation, wherein there is a test provided by a very long line on the screen 52, and without accommodation (FIG. 4a), the test illustrates a line or text distortion, whereby also the brightness of sun spots projected on the screen eliminates or obscures the clarity of the projected text on the screen of "this is a very long line" while, concurrently, also the failure to provide the correlation from the adapter module 62 does not permit the entire text to be projected onto this screen due to a lack of fitness (FIG. 4b). However, with the system providing for accommodation, the line or screen image orientation has been corrected (FIG. 4c) and the entire text of the line is clearly displayed, and image contrast has been improved due to the inventive computerized adaptation system for the projector images.

Figure 5:
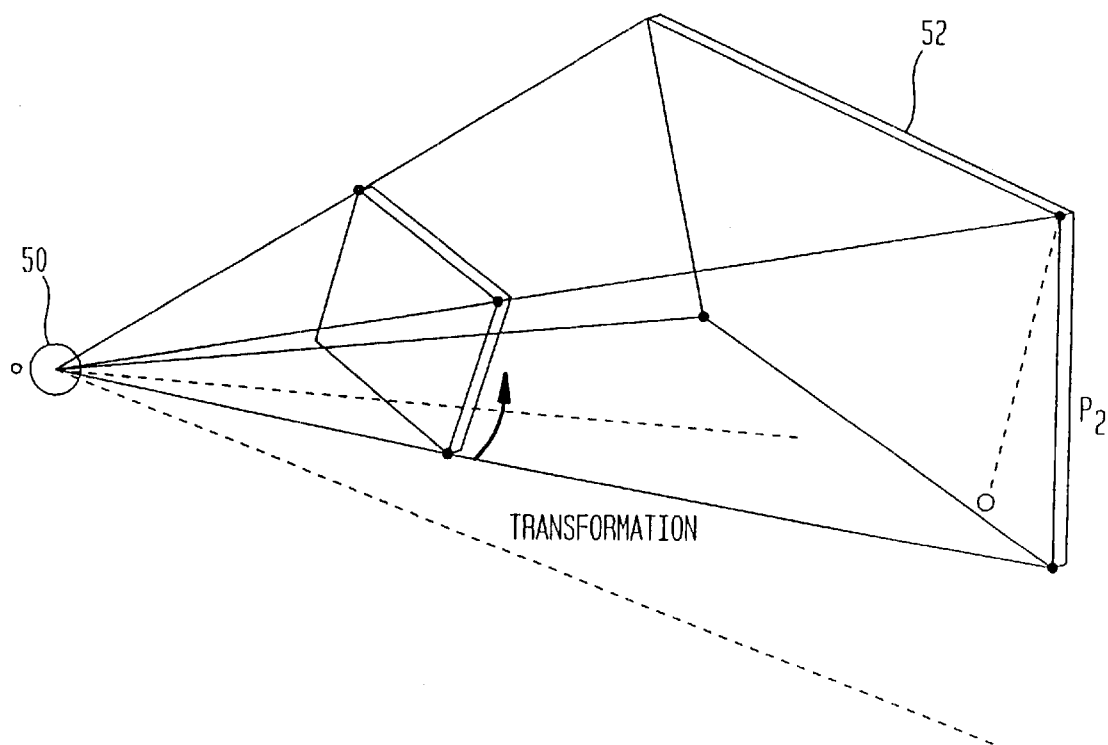
FIG. 5 illustrates a schematic representation of image transformation in projection onto are angled well surface.
Figure 6A:
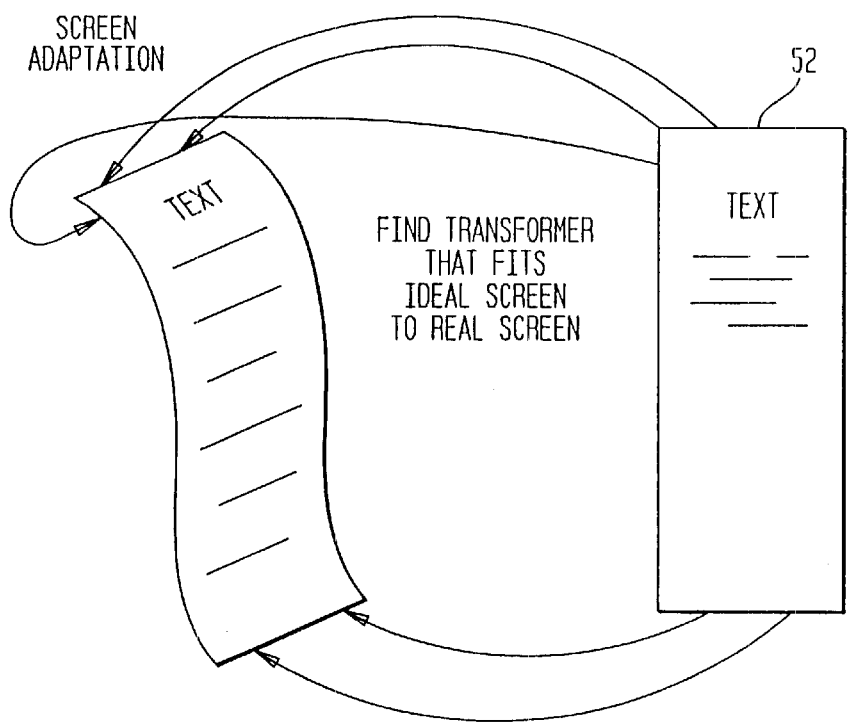
FIGS. 6a and 6b; illustrate, respectively, schematic representations of image transformation that fits ideal screen surface to a screen surface.
Figure 6B:
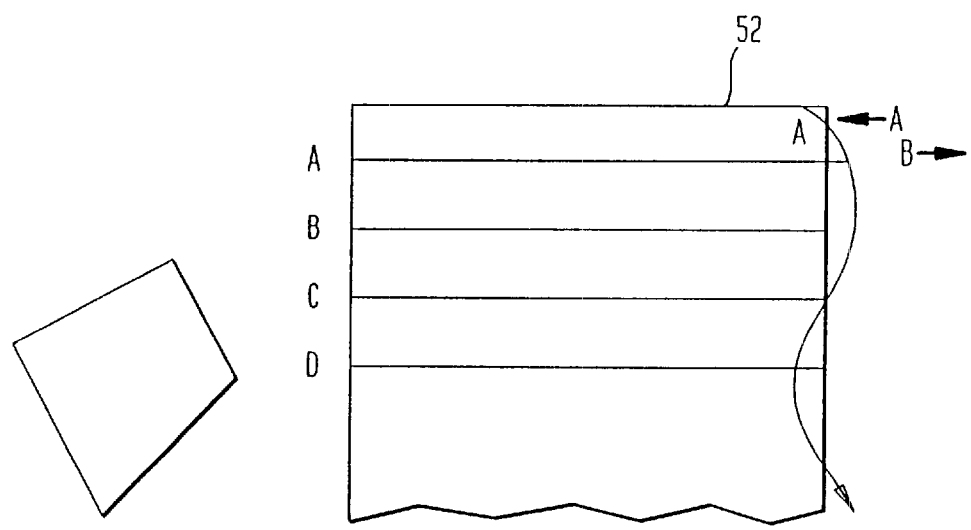

Referring to FIG. 5, this shows the representation of the transformation of the projected image on an angled screen surface. FIGS. 6a and 6b show the screen adaptation with regard to the projection of text or data through a transformation that fits an ideal screen to a real screen.

Figure 7:
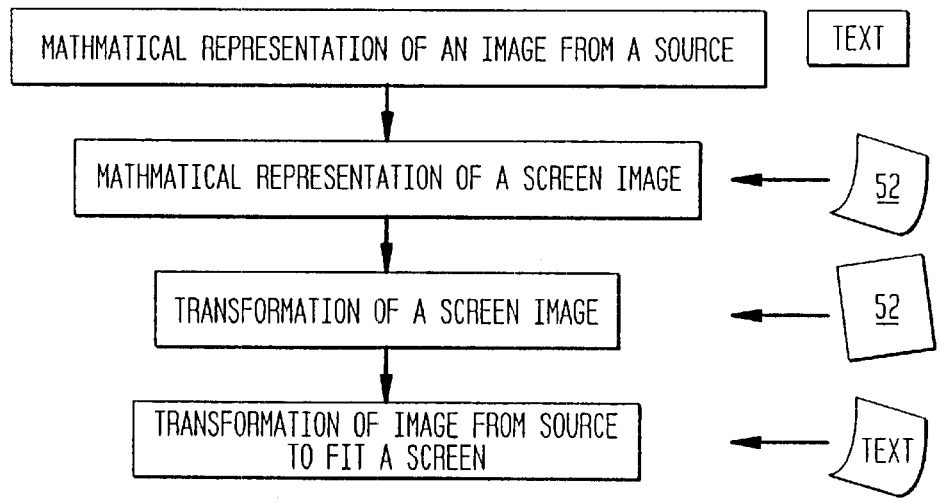
FIG. 7 illustrates a-flow chart of an adapter module utilized in the computerized projector system pursuant to the invention.

As shown in FIG. 7 of the drawings, the flow chart of the adapter module 62 indicates that there is provided a mathematical representation of an image from a source; which then is also indicated as a mathematical representation of a screen image, a transformation of the screen image; and transformation of the image from the source to fit the screen 52, as described hereinabove.

Figure 8:
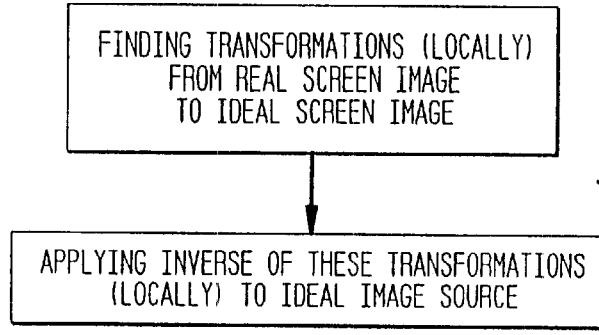
FIG. 8 illustrates a flow chart of a projector module employed in finding of a transformation (locally) which maps an ideal projected screen image into a transformed image which fits a curved screen.

As indicated in FIG. 8 of the drawings in the flow chart for the projector displaying module 66, there is an indication of finding the transformations (locally) from the real screen image to the ideal screen image, then applying an inverse of these transformations (locally) to the ideal image source so as to provide through the various aspects of either the mathematical transformation by means of utilizing rotation, scaling, changing color, image proportions, orientation of part of the image, and transforming contours and other mathematical variables so as to provide for the corrected image projection onto the screen 52.

From the foregoing, it is become readily apparent that the invention is directed to a clearly novel system for image projection by a projector through the computerized automatic control thereof in order to fit any type of screen, irrespective as to physical deformations or impingement of sunspots or beams of light onto portions of the screen 52.

While there has been shown and described what is considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What we claim is:

1. A projector system for automatically adapting projected images to the shape and position of a display screen relative to a single projector providing an undistorted image, comprising a plurality of modules; including:

a) a video camera operatively connected to the projector and which obtains pictures from a screen on which images from a projector are displayed;

b) an image processing module which obtains images from a source and stores said images in a random access memory (RAM);

c) an adapter module for comparing the screen format with the images which are stored in said RAM and transforms said images to fit the display of images to said screen; and d) a projector displaying module of said projector for projecting said transformed images onto said screen;

the fitness of the transformed images relative to the screen requiring satisfaction of selectively at least one of a plurality of the following criteria:
  (i) each line of an image is accommodated locally with a line on the screen where the image is displayed;
  (ii) orientation of each unit in an image is oriented locally in accordance with orientation of a part of the screen where said image unit is displayed;
  (iii) the brightness of each image unit is accommodated locally with the brightness and reflective properties of a corresponding part of the screen where said image unit is displayed; the brightness accommodation signifying that
    a) the image contour is respectively sharpened or softened when lighting from the environment respectively reduces or increases the perceptual clarity of displayed images at local areas; and
    b) the brightness of image colors is varied when different sources of lights from the environment produce different local lighting to reduce the variability effect;
  (iv) the content of each image unit is adapted locally to a geometric form of a local screen area where said image unit is displayed; and
  (v) the content of each image unit is adapted to one or several points of view from which said screen is viewed.

2. A projector system as claimed in claim 1, wherein said screen is selectively constituted of a standard projection screen, a wall, a list of paper, a ceiling, a floor, or any covering surface.

3. A projector system as claimed in claim 1, wherein the source supplying images to said image processing module is selectively a film with captured images, a memory with stored digital images, or a process which captures images from some place.

4. A projector system as claimed in claim 1, wherein the screen format includes at least one or a plurality of features concerned with screen contour, screen size, an angle of view of the screen from the projector display location, screen orientation, screen covering surface, and brightness at a different locations on the screen surface.

5. A projector system as claimed in claim 1, wherein the accommodation of each said line signifies that
  a) the images are displayed on said screen as they would be viewed on said screen as if printed thereon;
  b) when a line of the screen is curved because a screen contour is transformed, then an image line on said screen is transformed proportionally to the transformation of the screen line.

6. A projector system as claimed in claim 1, wherein the local orientation of an image unit on said screen signifies that
  a) the image units are oriented on said screen way as they would be oriented on said screen as if printed thereon; and
  b) when a local area of the screen is curved because a screen contour is transformed, then an image unit orientation on said screen is transformed proportionally to the transformation of the screen area.

7. A projector system as claimed in claim 1, wherein an image unit defines a part of a text, a letter, a part of a picture, or a squared small area of a picture.

8. A projector system as claimed in claim 1, wherein said adapter module implements operations:
  a) a mathematical representation of an image from the source;
  b) a mathematical representation of a screen image obtained from said camera;
  c) transformation of the mathematical representation to a new representation to fit the mathematical representation of the screen to satisfy viewing conditions; and
  d) representation of the mathematical form of an image as a physical quantity which is transmitted to the screen by the projector module.

9. A projector system as claimed in claim 8, wherein a physical quantity corresponding to a mathematical form of the image is a set of lights traces which produces the image on the screen.

10. A projector system as claimed in claim 8, wherein the mathematical form of the image is represented by an area in a computer memory.

11. A projector system as claimed in claim 8, wherein the mathematical form of the image represents image colors, spatial properties, and contours.

12. A projector system as claimed in claim 8, wherein the mathematical transformations comprise selectively utilize rotation, scaling, changing color intensity, changing figure proportions, changing orientation of parts of the figure, transforming contours, and mathematical variables which represent image parameters selected from colors, intensity, and brightness.

13. A projector system as claimed in claim 8, wherein the mathematical representation of the image screen comprises representation of the screen as a real geometric figure which corresponds to a screen view from a projector point of location.

14. A projector system as claimed in claim 8, wherein mathematical transformation satisfying viewing conditions, comprises:
  a) a representation of the screen obtained as an ideal geometric figure which the screen would have if placed under ideal conditions;
  b) a representation of the screen as a real geometric figure;
  c) finding mathematical transformations which map an ideal geometric representation of the screen into the real geometric representation;
  d) finding a mathematical representation of the image from the source; and
  e) applying the mathematical transformations from step c) to the mathematical representation of the image from the source.

15. A projector system as claimed in claim 14, wherein the representation of the screen as an ideal geometric figure comprises:
  a) the representation of the screen in the closest corresponding geometric form: such as square, polygon, circle, or oval; and
  b) the representation of lighting condition in the closest corresponding homogenous form.

16. An image projecting method for automatically adapting projected images to the shape and position of a display screen relative to a single projector providing an undistorted image through the utilization of a plurality of modules; comprising:
  a) operatively connecting a video camera to the projector and which obtains pictures from a screen on which images from a projector are displayed;
  b) causing an image processing module to obtain images from a source and store said images in a random access memory (RAM);
  c) having an adapter module compare the screen format with the images which are stored in said RAM and transforming said images to fit the display; and d) providing a projector displaying module for projecting said transformed images onto a screen; the fitness of the transformed images relative to the screen being determined in that selectively through one or more criteria in which:
   (i) each line of an image is accommodated locally with a line on the screen where the image is displayed;
   (ii) orientation of each unit in an image is oriented locally in accordance with orientation of a part of the screen where said image unit is displayed;
   (iii) the brightness of each image unit is accommodated locally with the brightness and reflective properties of a corresponding part of the screen where said image unit is displayed; the brightness accommodation signifying that
      a) the image contour is respectively sharpened or softened when lighting from the environment respectively reduces or increases the perceptual clarity of displayed images at local areas; and
      b) the brightness of image colors is varied when different sources of lights from the environment produce different local lighting to reduce the variability effect;
   (iv) the content of each image unit is adapted locally to a geometric form of a local screen area where said image unit is displayed; and
   (v) the content of each image unit is adapted to one or several points of view from which said screen is viewed.

17. A method as claimed in claim 16, wherein said screen is selectively constituted of a standard projection screen, a wall, a list of paper, a ceiling, a floor, or any covering surface.

18. A method as claimed in claim 16, wherein the source is selected from a film with captured images, a memory with stored digital images, or a process which captures images from some place.

19. A method as claimed in claim 16, wherein the screen format includes at least one or more of the following features comprising screen contour, screen size, an angle of view of the screen from the projector display location, screen orientation, screen covering surface, and a brightness at a different locations on the screen surface.

20. A method as claimed in claim 16, wherein the accommodation of each said line signifies that
   a) the images are displayed on said screen as they would be viewed on said screen as if printed thereon;
   b) when a line of the screen is curved because a screen contour is transformed, then an image line on said screen is transformed proportionally to the transformation of the screen line.

21. A method as claimed in claim 16, wherein the local orientation of an image unit on the screen signifies that
   a) the image units are oriented on said screen way as they would be oriented on said screen as if printed thereon; and
   b) when a local area of the screen is curved because a screen contour is transformed, then an image unit orientation on said screen is transformed proportionally to the transformation of the screen area.

22. A method as claimed in claim 16, wherein an image unit defines a part of a text, a letter, a part of a picture, or a squared small area of a picture.

23. A method as claimed in claim 16, wherein said adapter module implements the operations of
   a) a mathematical representation of an image from said source;
   b) a mathematical representation of a screen image obtained from said camera;
   c) transformation of the mathematical representation to a new representation to fit the mathematical representation of the screen to satisfy viewing conditions; and
   d) representation of the mathematical form of an image as a physical quantity which is transmitted to the screen by the projector module.

24. A method as claimed in claim 23, wherein a physical quantity corresponding to a mathematical form of the image is a set of lights traces which produces the image on the screen.

25. A method as claimed in claim 23, wherein the mathematical form of the image is represented by an area in a computer memory.

26. A method as claimed in claim 23, wherein the mathematical form of the image represents image colors, spatial properties, and contours.

27. A method as claimed in claim 23, wherein the mathematical transformation selectively utilizes rotation, scaling, changing color intensity, changing figure proportions, changing orientation of parts of the figure, transforming contours, and mathematical variables that represent image parameters selected from colors, intensity, and brightness.

28. A method as claimed in claim 23, wherein the mathematical representation of the image screen comprises representing the screen as a real geometric figure which corresponds to a screen view from a projector point of location.

29. A method as claimed in claim 23, wherein mathematical transformation satisfying viewing conditions, comprises:
   a) obtaining a representation of the screen as an ideal geometric figure which the screen would have if placed under ideal conditions;
   b) providing a representation of the screen as a real geometric figure;
   c) finding mathematical transformations which map an ideal geometric representation of the screen into the real geometric representation;
   d) finding a mathematical representation of the image from the source; and
   e) applying the mathematical transformations from step c) to the mathematical representation of the image from the source.

30. A method as claimed in claim 29, wherein the representation of the screen as an ideal geometric figure comprises:
   a) representing the screen in the closest corresponding geometric form, such as square, polygon, circle, or oval; and
   b) providing the representation of lighting condition in the closest corresponding homogenous form.

* * * * *

UNITED STATES PATENT AND TRADEMARK OFFICE
CERTIFICATE OF CORRECTION

PATENT NO. : 6,597,410 B1
DATED : July 22, 2003
INVENTOR(S) : Faud E. Doany

It is certified that error appears in the above-identified patent and that said Letters Patent is hereby corrected as shown below:

Column 2,
Line 56, "a-flow" should read -- a flow --

Signed and Sealed this

Fourteenth Day of October, 2003

JAMES E. ROGAN
*Director of the United States Patent and Trademark Office*